United States Patent
Nunnink

(10) Patent No.: US 10,678,019 B2
(45) Date of Patent: *Jun. 9, 2020

(54) VISION SYSTEM CAMERA WITH MOUNT FOR MULTIPLE LENS TYPES

(71) Applicant: Cognex Corporation, Natick, MA (US)

(72) Inventor: Laurens Nunnink, Simpleveld (NL)

(73) Assignee: COGNEX CORPORATION, Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/119,909

(22) Filed: Aug. 31, 2018

(65) Prior Publication Data

US 2019/0265433 A1 Aug. 29, 2019

Related U.S. Application Data

(63) Continuation of application No. 14/611,401, filed on Feb. 2, 2015, now Pat. No. 10,067,312, which is a
(Continued)

(51) Int. Cl.
*H04N 5/225* (2006.01)
*G03B 17/02* (2006.01)
(Continued)

(52) U.S. Cl.
CPC ............ *G02B 7/14* (2013.01); *G02B 3/14* (2013.01); *G02B 7/022* (2013.01); *G02B 26/005* (2013.01);
(Continued)

(58) Field of Classification Search
CPC .. H04N 5/2251; H04N 5/2252; H04N 5/2253; G03B 17/14
See application file for complete search history.

(56) References Cited

U.S. PATENT DOCUMENTS 1,873,149 A 8/1932 Perez
2,409,328 A 10/1946 Wilder
(Continued)

FOREIGN PATENT DOCUMENTS

CN 1230815 A 10/1999
CN 101027794 A 8/2007
(Continued)

OTHER PUBLICATIONS

Cognex Corporation, "Cognex Expands Reading Capability", Nov. 5, 2010, Publisher: Cognex corporation, Published in: US.
(Continued)

*Primary Examiner* — Abdelaaziz Tissire
(74) *Attorney, Agent, or Firm* — Loginov IP

(57) ABSTRACT

This invention provides a vision system housing having a front plate assembly that accommodates a plurality of lens mount types. The front plate includes a central aperture that is located at a predetermined axial (camera axis) distance from a plane of an image sensor. The aperture is stepped from a wider diameter adjacent to the front to a narrower diameter more adjacent to the sensor. This arrangement enables threaded mounting of a plurality of lens mount types, for example M12 and C-Mount. The exterior (front) surface of the front plate includes threaded holes and a removable spring clip arrangement constructed to accommodate a liquid lens positioned over the aperture with an associated lens assembly mounted within the aperture and in optical communication with the liquid lens. The lens is operated using an electrical connection provided by a cable that interconnects with a multi-pin socket positioned on the front plate.

12 Claims, 10 Drawing Sheets

Related U.S. Application Data continuation of application No. 13/302,751, filed on Nov. 22, 2011, now Pat. No. 8,947,590.

(51) Int. Cl.
- G02B 7/14 (2006.01)
- G02B 3/14 (2006.01)
- G02B 26/00 (2006.01)
- G03B 17/14 (2006.01)
- G02B 7/02 (2006.01)

(52) U.S. Cl.
CPC ............. *G03B 17/02* (2013.01); *G03B 17/14* (2013.01); *H04N 5/2251* (2013.01); *H04N 5/2252* (2013.01); *H04N 5/2253* (2013.01)

(56) References Cited

U.S. PATENT DOCUMENTS

| | | | |
|---|---|---|---|
| 3,682,069 A * | 8/1972 | Lecoeur | G03B 17/14 359/827 |
| 3,709,132 A | 1/1973 | Farrell | |
| 3,940,777 A | 2/1976 | Komine | |
| 4,072,396 A | 2/1978 | Ross | |
| 4,160,590 A | 7/1979 | Reynard | |
| 4,230,403 A | 10/1980 | Hashimoto | |
| 4,314,752 A | 2/1982 | Ishizaka | |
| 4,451,131 A | 5/1984 | Shimizu | |
| 4,478,491 A | 10/1984 | Kawai | |
| 4,490,018 A | 12/1984 | Yokotsuka | |
| 4,494,828 A | 1/1985 | Masumoto | |
| 4,591,253 A | 5/1986 | Hecker | |
| 4,781,448 A | 11/1988 | Chatenever | |
| 4,864,341 A | 9/1989 | Maekawa | |
| 4,871,238 A | 10/1989 | Sato | |
| 4,877,949 A | 10/1989 | Danielson | |
| 4,894,677 A | 1/1990 | Bourcier | |
| 4,974,138 A | 11/1990 | Negishi | |
| 5,010,412 A | 4/1991 | Garriss | |
| 5,019,699 A | 5/1991 | Koenck | |
| 5,136,320 A | 8/1992 | Kobayashi | |
| 5,155,343 A | 10/1992 | Chandler | |
| 5,245,172 A | 9/1993 | Esslinger | |
| 5,245,671 A | 9/1993 | Kobayashi | |
| 5,247,162 A | 9/1993 | Swartz | |
| 5,291,232 A | 3/1994 | Kobayashi | |
| 5,308,966 A | 5/1994 | Danielson | |
| 5,313,053 A | 5/1994 | Koenck | |
| 5,331,176 A | 7/1994 | Sant Anselmo | |
| 5,331,178 A | 7/1994 | Fukuda | |
| 5,349,172 A | 9/1994 | Roustaei | |
| 5,363,164 A | 11/1994 | Kobayashi | |
| 5,365,597 A | 11/1994 | Holeva | |
| 5,378,883 A | 1/1995 | Batterman | |
| 5,399,846 A | 3/1995 | Pavlidis | |
| 5,471,043 A | 11/1995 | Knapp | |
| 5,473,150 A | 12/1995 | Huhn | |
| 5,478,997 A | 12/1995 | Bridgelall | |
| 5,500,516 A | 3/1996 | Durbin | |
| 5,513,264 A | 4/1996 | Wang | |
| 5,569,902 A | 10/1996 | Wood | |
| 5,572,006 A | 11/1996 | Wang | |
| 5,580,163 A | 12/1996 | Johnson, II | |
| 5,587,843 A | 12/1996 | Chen | |
| 5,596,368 A | 1/1997 | Capper | |
| 5,598,007 A | 1/1997 | Bunce | |
| 5,608,202 A | 3/1997 | Bridgelall | |
| 5,627,360 A | 5/1997 | Rudeen | |
| 5,640,001 A | 6/1997 | Danielson | |
| 5,644,441 A | 7/1997 | Hirasaki | |
| 5,659,167 A | 8/1997 | Wang | |
| 5,672,858 A | 9/1997 | Li | |
| 5,715,095 A | 2/1998 | Hiratsuka | |
| 5,734,153 A | 3/1998 | Swartz | |
| 5,756,981 A | 5/1998 | Roustaei | |
| 5,773,810 A | 6/1998 | Hussey | |
| 5,783,811 A | 7/1998 | Feng | |
| 5,786,582 A | 7/1998 | Roustaei | |
| 5,786,586 A | 7/1998 | Pidhirny | |
| 5,793,033 A | 8/1998 | Feng | |
| 5,811,828 A | 9/1998 | Laser | |
| 5,818,528 A | 10/1998 | Roth | |
| 5,821,518 A | 10/1998 | Sussmeier | |
| 5,825,006 A | 10/1998 | Longacre | |
| 5,825,559 A | 10/1998 | Johnson | |
| 5,834,754 A | 11/1998 | Feng | |
| 5,844,229 A | 12/1998 | Rockstein | |
| 5,864,128 A | 1/1999 | Plesko | |
| 5,886,338 A | 3/1999 | Arackellian | |
| 5,897,195 A | 4/1999 | Choate | |
| 5,943,169 A | 8/1999 | Okada | |
| 5,945,658 A | 8/1999 | Salatto, Jr. | |
| 5,949,057 A | 9/1999 | Feng | |
| 5,969,321 A | 10/1999 | Danielson | |
| 5,992,751 A | 11/1999 | Laser | |
| 6,022,124 A | 2/2000 | Bourn | |
| 6,060,722 A | 5/2000 | Havens | |
| 6,066,857 A | 5/2000 | Fantone | |
| 6,073,851 A | 6/2000 | Olmstead | |
| 6,098,887 A | 8/2000 | Figarella | |
| 6,164,544 A | 12/2000 | Schwartz | |
| 6,172,709 B1 | 1/2001 | Yamano | |
| 6,179,208 B1 | 1/2001 | Feng | |
| 6,223,986 B1 | 5/2001 | Bobba | |
| 6,223,988 B1 | 5/2001 | Batterman | |
| 6,238,060 B1 | 5/2001 | Bourn | |
| 6,266,196 B1 | 7/2001 | Do | |
| 6,273,338 B1 | 8/2001 | White | |
| 6,298,176 B2 | 10/2001 | Longacre | |
| 6,318,924 B1 * | 11/2001 | Schiavo, Jr. | B62J 11/00 403/299 |
| 6,339,680 B1 | 1/2002 | Mauvais | |
| 6,340,114 B1 | 1/2002 | Correa | |
| 6,347,163 B2 | 2/2002 | Roustaei | |
| 6,385,507 B1 | 5/2002 | Buijtels | |
| 6,431,452 B2 | 8/2002 | Feng | |
| 6,445,450 B1 | 9/2002 | Matsumoto | |
| 6,449,430 B1 | 9/2002 | Tasaka | |
| 6,474,556 B2 | 11/2002 | Dickson | |
| 6,527,183 B2 | 3/2003 | Bard | |
| 6,542,238 B1 | 4/2003 | Tsuboi | |
| 6,556,355 B2 | 4/2003 | Tsutsumi | |
| 6,607,132 B1 | 8/2003 | Dvorkis | |
| 6,636,298 B1 | 10/2003 | Bachelder | |
| 6,651,886 B2 | 11/2003 | Gurevich | |
| 6,651,888 B1 | 11/2003 | Gurevich | |
| 6,659,350 B2 | 12/2003 | Schwartz | |
| 6,663,260 B1 | 12/2003 | Tieszen | |
| 6,669,093 B1 | 12/2003 | Meyerson | |
| 6,681,994 B1 | 1/2004 | Koenck | |
| 6,689,998 B1 | 2/2004 | Bremer | |
| 6,712,270 B2 | 3/2004 | Leach | |
| 6,729,546 B2 | 5/2004 | Roustaei | |
| 6,765,393 B2 | 7/2004 | Pierenkemper | |
| 6,781,630 B2 | 8/2004 | Nomura | |
| 6,805,295 B2 | 10/2004 | Barkan | |
| 6,808,114 B1 | 10/2004 | Palestini | |
| 6,809,847 B2 | 10/2004 | McQueen | |
| 6,827,270 B2 | 12/2004 | Yomogida | |
| 6,832,725 B2 | 12/2004 | Gardiner | |
| 6,832,729 B1 | 12/2004 | Perry | |
| 6,837,433 B2 | 1/2005 | Jam | |
| 6,845,915 B2 | 1/2005 | Krichever | |
| 6,866,198 B2 | 3/2005 | Patel | |
| 6,877,664 B1 | 4/2005 | Oliva | |
| 6,891,679 B2 | 5/2005 | Atarashi | |
| 6,918,538 B2 | 7/2005 | Breytman | |
| 6,967,794 B2 | 11/2005 | Luthardt | |
| 6,974,085 B1 | 12/2005 | Koenck | |
| 6,997,385 B2 | 2/2006 | Palestini | |
| 7,007,843 B2 | 3/2006 | Poloniewicz | |
| 7,025,271 B2 | 4/2006 | Dvorkis | |
| 7,025,272 B2 | 4/2006 | Yavid | |
| 7,025,273 B2 | 4/2006 | Breytman | |

(56) References Cited

U.S. PATENT DOCUMENTS

| | | |
|---|---|---|
| 7,042,490 B2 | 5/2006 | Numazaki |
| 7,055,747 B2 | 6/2006 | Havens |
| 7,063,256 B2 | 6/2006 | Anderson |
| 7,073,711 B2 | 7/2006 | Fernandez |
| 7,073,715 B2 | 7/2006 | Patel |
| 7,075,663 B2 | 7/2006 | Canini |
| 7,077,325 B2 | 7/2006 | Tan |
| 7,090,137 B1 | 8/2006 | Bennett |
| 7,097,105 B2 | 8/2006 | Wilz, Sr. |
| 7,128,266 B2 | 10/2006 | Zhu |
| 7,136,582 B2 | 11/2006 | Hayami |
| 7,147,159 B2 | 12/2006 | Longacre, Jr. |
| 7,201,318 B2 | 4/2007 | Craen |
| 7,222,793 B2 | 5/2007 | Patel |
| 7,224,540 B2 | 5/2007 | Olmstead |
| 7,264,162 B2 | 9/2007 | Barkan |
| 7,292,281 B2 | 11/2007 | Cheng |
| 7,296,749 B2 | 11/2007 | Massieu |
| 7,311,260 B2 | 12/2007 | Zosel |
| 7,315,241 B1 | 1/2008 | Daily |
| 7,344,273 B2 | 3/2008 | Lewis |
| 7,387,246 B2 | 6/2008 | Palestini |
| 7,392,951 B2 | 7/2008 | Ray |
| 7,395,970 B2 | 7/2008 | Poloniewicz |
| 7,454,841 B2 | 11/2008 | Burns, Jr. |
| 7,549,582 B1 | 6/2009 | Nunnink |
| 7,646,423 B2 | 1/2010 | Yoshida |
| 7,686,223 B2 | 3/2010 | Vinogradov |
| 7,813,047 B2 | 10/2010 | Wang |
| 7,850,377 B2 | 12/2010 | Okamoto |
| 7,853,137 B2 | 12/2010 | Yang |
| 7,900,839 B2 | 3/2011 | Kotlarsky |
| 7,942,329 B2 | 5/2011 | Pine |
| 7,957,007 B2 | 6/2011 | Raskar |
| 7,994,452 B2 | 8/2011 | Sawabe |
| 8,134,116 B2 | 3/2012 | Nunnink |
| 8,731,389 B2 * | 5/2014 | Gainer ............... G03B 3/10 396/133 |
| 8,947,590 B2 * | 2/2015 | Nunnink ............ G03B 17/02 348/374 |
| 9,823,552 B2 | 11/2017 | Kungl |
| 2001/0012413 A1 | 8/2001 | Longacre |
| 2001/0017731 A1 | 8/2001 | Smith |
| 2002/0014532 A1 | 2/2002 | Yomogida |
| 2002/0034320 A1 | 3/2002 | Mann |
| 2002/0039099 A1 | 4/2002 | Harper |
| 2002/0057440 A1 | 5/2002 | Weiner |
| 2002/0074403 A1 | 6/2002 | Krichever |
| 2002/0130963 A1 * | 9/2002 | Gelbard ............. G03B 17/14 348/360 |
| 2002/0171745 A1 | 11/2002 | Ehrhart |
| 2002/0191309 A1 | 12/2002 | Taylor |
| 2003/0019934 A1 | 1/2003 | Hunter |
| 2003/0020491 A1 | 1/2003 | Pierenkemper |
| 2003/0062413 A1 | 4/2003 | Gardiner |
| 2003/0085283 A1 | 5/2003 | Barkan |
| 2003/0132291 A1 | 7/2003 | Schmidt |
| 2003/0201327 A1 | 10/2003 | Jam |
| 2003/0205620 A1 | 11/2003 | Byun |
| 2003/0226895 A1 | 12/2003 | Havens |
| 2004/0020990 A1 | 2/2004 | Havens |
| 2004/0060032 A1 | 3/2004 | McCubbrey |
| 2004/0092138 A1 | 5/2004 | Smith |
| 2004/0159703 A1 | 8/2004 | Kogan |
| 2004/0238637 A1 | 12/2004 | Russell |
| 2005/0035204 A1 | 2/2005 | Knappert |
| 2005/0045725 A1 | 3/2005 | Gurevich |
| 2005/0103851 A1 | 5/2005 | Zhu |
| 2005/0103854 A1 | 5/2005 | Zhu |
| 2005/0103857 A1 | 5/2005 | Zhu |
| 2005/0103858 A1 | 5/2005 | Zhu |
| 2005/0133601 A1 | 6/2005 | Yomogida |
| 2005/0167504 A1 | 8/2005 | Meier |
| 2005/0180037 A1 | 8/2005 | Masterson |
| 2005/0199725 A1 | 9/2005 | Craen |
| 2005/0212951 A1 | 9/2005 | Miyata |
| 2006/0008267 A1 | 1/2006 | Kim |
| 2006/0027659 A1 | 2/2006 | Patel |
| 2006/0034596 A1 * | 2/2006 | Yamazaki ............. G02B 7/10 396/79 |
| 2006/0043187 A1 | 3/2006 | He |
| 2006/0043191 A1 | 3/2006 | Patel |
| 2006/0055819 A1 | 3/2006 | Pokrovsky |
| 2006/0060653 A1 | 3/2006 | Wittenberg |
| 2006/0081712 A1 | 4/2006 | Rudeen |
| 2006/0103755 A1 | 5/2006 | Costigan |
| 2006/0213994 A1 | 9/2006 | Faiz |
| 2006/0251408 A1 | 11/2006 | Konno |
| 2006/0279713 A1 | 12/2006 | Wang |
| 2007/0040034 A1 | 2/2007 | Hennick |
| 2007/0057067 A1 | 3/2007 | He |
| 2007/0131770 A1 | 6/2007 | Nunnink |
| 2007/0153512 A1 | 7/2007 | Hendrie |
| 2007/0164115 A1 | 7/2007 | Joseph |
| 2007/0170259 A1 | 7/2007 | Nunnink |
| 2007/0241195 A1 | 10/2007 | Hussey |
| 2007/0247422 A1 | 10/2007 | Vertegaal |
| 2008/0093530 A1 | 4/2008 | Hoelen |
| 2008/0121168 A1 | 5/2008 | Ryznar |
| 2008/0158678 A1 * | 7/2008 | Costigan ............. G02B 7/04 359/512 |
| 2008/0277480 A1 | 11/2008 | Thuries |
| 2009/0057413 A1 | 3/2009 | Vinogradov |
| 2009/0135287 A1 | 5/2009 | Yang |
| 2009/0159684 A1 | 6/2009 | Barber |
| 2009/0166424 A1 | 7/2009 | Gerst |
| 2009/0200380 A1 | 8/2009 | Longacre, Jr. |
| 2010/0013922 A1 | 1/2010 | Cheng |
| 2010/0165188 A1 * | 7/2010 | Jannard ............. H04N 5/2252 348/375 |
| 2010/0176319 A1 * | 7/2010 | Nunnink ............. G02B 3/14 250/566 |
| 2010/0177319 A1 | 7/2010 | Towers |
| 2011/0019106 A1 | 1/2011 | Kimura |
| 2011/0019162 A1 | 1/2011 | Huebner |
| 2011/0019914 A1 | 1/2011 | Bimber |
| 2011/0249966 A1 * | 10/2011 | Weber ............... G03B 17/02 396/530 |

FOREIGN PATENT DOCUMENTS

| | | |
|---|---|---|
| EP | 0574024 | 12/1993 |
| EP | 0745951 | 12/1996 |
| EP | 0755018 | 1/1997 |
| EP | 0840107 | 5/1998 |
| EP | 0957448 | 11/1999 |
| EP | 1308875 | 5/2003 |
| EP | 1519298 A2 | 3/2005 |
| EP | 1560150 B1 | 8/2005 |
| GB | 2444399 A | 6/2008 |
| JP | H09128471 | 5/1997 |
| JP | H10134133 | 5/1998 |
| TW | M350188 | 2/2009 |
| WO | 9603708 A1 | 2/1996 |
| WO | 9816896 A1 | 4/1998 |
| WO | 0016241 A1 | 3/2000 |
| WO | 03062956 A2 | 7/2003 |
| WO | 03063064 A1 | 7/2003 |
| WO | 2005041111 A2 | 5/2005 |
| WO | 2005050390 A2 | 6/2005 |
| WO | 2005073895 A1 | 8/2005 |
| WO | 2006004858 A2 | 1/2006 |
| WO | 2006026239 A2 | 3/2006 |
| WO | 2008076399 | 6/2008 |
| WO | 2010036403 A2 | 4/2010 |

OTHER PUBLICATIONS

Cognex Corporation, "Dataman 100 SHD/C-Mount Kit Removal Instructions", 2007, Publisher: Cognext Corporation, Published in: US.

(56) References Cited

OTHER PUBLICATIONS

Gainer, "U.S. Appl. No. 13/302,922, Auto-Focus Mechanism for Vision System Camera", filed Nov. 22, 2011.
Nunnink, , "Vision System and Camera with Mount for Multiple Lens Types", U.S. Appl. No. 13/302,751, filed Nov. 22, 2011.
Nunnink, "U.S. Appl. No. 13/302,858, Camera System With Exchangeable Illumiantion Assembly", filed Nov. 22, 2011.
Panasonic, "Lumix G Micro System", Oct. 2008, Published in: Germany (With English Language Translation of p. 1).
Wikipedia, "Interchangeable Lens", Oct. 12, 2011, Published in: Germany (With English Language Translation of 1st Paragraph).

* cited by examiner

VISION SYSTEM CAMERA WITH MOUNT FOR MULTIPLE LENS TYPES

RELATED APPLICATIONS

This application is a continuation of co-pending U.S. patent application Ser. No. 14/611,401, filed Feb. 2, 2015, entitled VISION SYSTEM CAMERA WITH MOUNT FOR MULTIPLE LENS TYPES, which is a continuation of U.S. patent application Ser. No. 13/302,751, filed Nov. 22, 2011, now U.S. Pat. No. 8,947,590, issued Feb. 3, 2015, entitled VISION SYSTEM CAMERA WITH MOUNT FOR MULTIPLE LENS TYPES, the entire disclosures of each of which are expressly incorporated herein by reference.

FIELD OF THE INVENTION

This invention relates to vision system cameras and more particularly to lens mounts for vision system cameras.

BACKGROUND OF THE INVENTION

Vision systems that perform measurement, inspection, alignment of objects and/or decoding of symbology (e.g. bar codes) are used in a wide range of applications and industries. These systems are based around the use of an image sensor, which acquires images (typically grayscale or color, and in one, two or three dimensions) of the subject or object, and processes these acquired images using an on-board or interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities. In the example of a symbology (barcode) reader, the user or automated process acquires an image of an object that is believed to contain one or more barcodes. The image is processed to identify barcode features, which are then decoded by a decoding process and/or processor obtain the inherent alphanumeric data represented by the code.

It is increasingly desirable to provide vision systems and associated vision system components that can be used for a variety of purposes. By way of example, an integrated sensor and single instruction, multiple data (SIMD) processor, which can be termed a vision system on a chip (VSoC), is shown and described in U.S. patent application Ser. No. 12/184,187, entitled VISION SENSORS, SYSTEMS AND METHODS, by E. John McGarry, et al., the teachings of which are incorporated by reference as useful background information. This architecture provided a highly versatile and widely applicable vision system platform for a variety of vision system tasks. The ability to provide a versatile system reduces costs by eliminating the need to provide a number of purpose-built vision system arrangements for specific applications. It is therefore desirable to provide such versatile vision system platforms. Other currently available arrangements of sensors and processors (e.g. digital signal processors (DSPs) can also be employed to provide a relatively compact and robust vision system.

While programs can be readily adapted for a particular vision system task, it is more of a challenge to adapt the system's physical package to that task. For example, some vision tasks call for a larger lens, such as a cine or C-mount unit, while others can be accomplished best with a smaller M12 thread (12 mm×0.5 mm thread) lens, also termed an "S-mount", or more basically, an "M12" lens. Others are best suited to a liquid lens, or a similar arrangement. By way of further background, a liquid lens uses two iso-density liquids—oil is an insulator while water is a conductor. The variation of voltage passed through the lens by surrounding circuitry leads to a change of curvature of the liquid-liquid interface, which in turn leads to a change of the focal length of the lens. Some significant advantages in the use of a liquid lens are the lens' ruggedness (it is free of mechanical moving parts), its fast response times, its relatively good optical quality, and its low power consumption and size. The use of a liquid lens can desirably simplify installation, setup and maintenance of the vision system by eliminating the need to manually touch the lens. Relative to other autofocus mechanisms, the liquid lens has extremely fast response times. It is also ideal for applications with reading distances that change from object-to-object (surface-to-surface) or during the changeover from the reading of one object to another object.

The choice of lens type (e.g. C-mount, M12, liquid lens, etc.) can be driven by such factors as lighting/illumination, field of view, focal distance, relative angle of the camera axis and imaged surface, and the fineness of details on the imaged surface. In addition, the cost of the lens and/or the available space for mounting the vision system can drive the choice of lens.

It is therefore desirable to provide a vision system that can readily accommodate a variety of lens types while avoiding the need of costly changes to the vision system's physical housing or package. This vision system should be able to employ multiple lens types with no reduction in quality of the acquired image when compared with using a system that provides a discrete, purpose-built lens mount.

SUMMARY OF THE INVENTION

This invention overcomes the disadvantages of the prior art by providing a vision system housing having a front plate assembly that accommodates a plurality of lens mount types. The front plate includes a central aperture that is located at a predetermined axial (camera axis) distance from a plane of an image sensor. The aperture is stepped from a wider diameter adjacent to the front to a narrower diameter more adjacent to the sensor. This arrangement of diameter and relative depth within the front plate enables threaded mounting of a plurality of lens mount types, illustratively an M12 lens mount and C-Mount. The threaded base for the M12 lens mount is provided in the smaller-diameter interior portion of the front plate aperture, adjacent to the sensor. Additionally, the threaded base for the C-Mount lens is provided at the front of the front plate, adjacent to the exterior surface of the front plate and housing. The exterior (front) surface of the front plate includes threaded holes and a spring clip arrangement (fastened by screws) constructed and arranged to accommodate a liquid lens positioned over the aperture with an associated lens assembly mounted within the aperture and in optical communication with the liquid lens. The lens is operated using an electrical connection provided by a cable that interconnects with a multi-pin socket positioned on the front plate aside the aperture. The socket interconnects with processor circuitry within the housing that enables control of the liquid lens.

In an illustrative embodiment the vision system defines a housing that includes a front plate assembly comprising an aperture aligned relative to an image sensor located within an interior of the housing, the aperture including an outer step having a first diameter and in inner step have a second diameter smaller than the first diameter. The first step is constructed and arranged to receive a first lens type base and the second step is constructed and arranged to receive a second lens type base. By way of example, the outer step is constructed and arranged to receive a C-mount lens base and the inner step is constructed and arranged to receive an M12 lens base. Moreover, the front plate assembly is constructed and arranged to receive, over the aperture, a liquid lens module. A clip assembly, illustratively comprising a spring assembly with retaining shoulders that is secured by screws to threaded holes around the aperture, engages portions of the housing or shell of the liquid lens module. The front plate assembly also illustratively includes a first socket, interconnected with control circuitry within the housing, which receives a cable to operate the liquid lens module. A second socket can also interconnect the control circuitry with an illuminator. The front plate assembly is illustratively attached to a body section of the housing using bolts having ends that are exposed at the outer face of the front plate assembly and pass into the body section. These ends can include threaded holes that receive fasteners that allow attachment of the front plate assembly to a mount or accessory.

More generally, in an illustrative embodiment, the vision system housing includes a main body section having an image sensor within the interior thereof. A front plate assembly is attached to the main body section. The front plate assembly includes threaded structures for selectively, removably and directly attaching at least three discrete types of lens thereto. By way of example, the three lens types can include a C-mount lens, and M12 lens and a liquid lens module.

BRIEF DESCRIPTION OF THE DRAWINGS

The invention description below refers to the accompanying drawings, of which.

DETAILED DESCRIPTION

Figure 1:
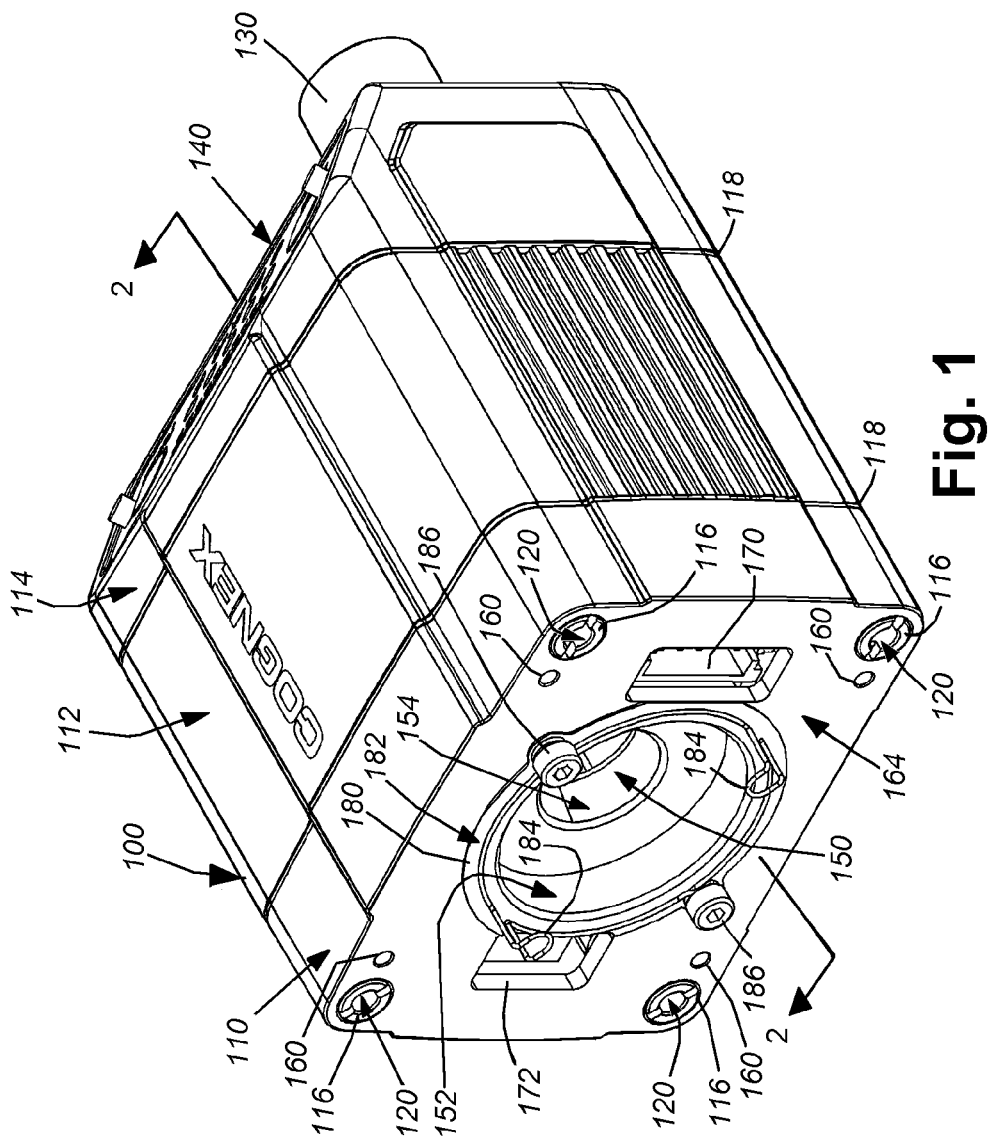
FIG. 1 is a perspective view of a vision system including a housing that allows for the removable attachment of a plurality of different lens mount types, showing the housing free of an attached lens, according to an illustrative embodiment.
Figure 2:
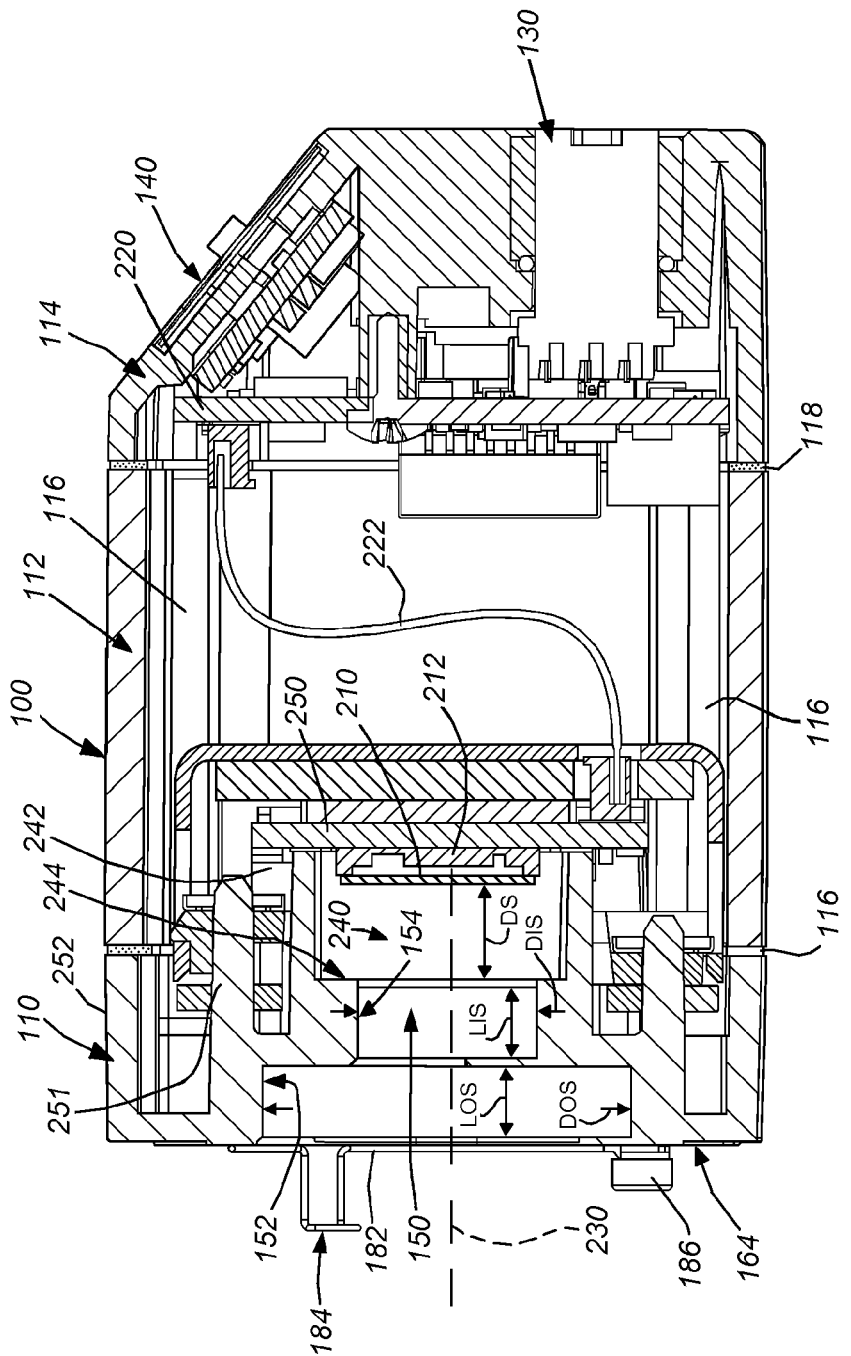
FIG. 2 is a side cross section of the housing taken along Line 2-2 of FIG. 1.

With reference to FIGS. 1 and 2, a vision system that includes an external package or "housing" 100 is shown in detail. The housing 100 can be constructed from polymer, metal, composite or a variety of materials in accordance with ordinary skill. In an embodiment, it consists of a front plate section 110, a main body section 112 and a rear section 114. The front plate section (or "front plate") 110 is joined to the main body and rear sections using four threaded bolts 116 that are seated within wells in the front plate 110, and that engage threaded holes in the rear section, thereby compressing the three sections together against gaskets 118 that seal the housing against infiltration of moisture and other environmental agents. The construction of the housing is highly variable in alternate embodiments. For example, the housing can be constructed with an integrated or unitary rear and main body or a unitary front plate and main body. Likewise, other fastening techniques can be employed, such as employing joining clamps or clips between sections.

In this embodiment, the bolts 116 are located adjacent to each of four corners of the somewhat rectangular-cross-section housing. The bolts 116 each contain respective threaded wells at their front end that allow for the attachment of accessories using threaded fasteners, or the attachment of the housing itself to a mounting surface. Alternatively, the bolts 116 can be substituted with appropriate bolts that also pass through holes in a mounting surface or accessory (not shown), and collectively join the surface/accessory to the sections of the housing in appropriate compression.

The interior of the housing 100 supports an image sensor 212 (FIG. 2) that is arranged to acquire each image frame as an array of individual image pixels. In an embodiment, the sensor array is a CMOS sensor 212 (also termed an "imager"), which acquires image data in the form of pixel data. A cover glass 210 is provided to protect the sensor array 212. The sensor 212 is mounted on a printed circuit board 250 secured as depicted near the front end of the housing. The sensor circuit board 250 also illustratively includes processing circuitry (e.g. a digital signal processor DSP) that receives the pixel data from the sensor array 212 and performs various vision system processes on the data in accordance with non-transitory computer-readable program instructions and/or firmware instructions. The sensor circuit board 250 is interconnected with various power, control and other associated circuit components located on a circuit board 220 in the rear 114 of the housing. The two board assemblies 220, 250 are illustratively interconnected by a multi-lead cable 222 in this embodiment. Other arrangements of circuitry and interconnections are expressly contemplated. For example, in another embodiment, a VSoC arrangement (described above) can be provided to perform image acquisition and processing. The rear section 114 (and/or other sections 110, 112 of the housing) can be constructed from aluminum so as to act as a heat sink that assists in dissipating heat generated within the housing by the circuitry (described further below).

An external connector (or a plurality of connectors) 130 are located at the rear side of the housing 100 for providing power, data and/or other interface functions. The connector (s) is/are operatively connected to the circuit board 220. The rear also includes an external status and control panel 140 that provides the user with status indicators and feedback on vision system operations (for example, indicating whether a symbol has been properly identified and decoded). Appropriate on/off switches and other interface buttons can also be provided at this location, or at another appropriate location on the housing 100.

The plane of the sensor 212 is oriented perpendicularly to the longitudinal axis (i.e. camera axis) 230 of the housing 100. It resides within a space 240 that is open to an aperture 150 within a central region of the front plate 110. The space 240 is bounded by an enclosing wall 242 (having a relatively planar sides that can define a rectangular cross-section tube) that provides clearance for the sensor 212. The wall 242 extends from a step face 244 to the surface of the sensor circuit board 250. The distance DS from the step face 244 to the plane of the sensor 212 is approximately 6 millimeters. The aperture 150 is defined by an outer step 152 and a narrower inner step 154. Each step is threaded as described below. In particular, the outer step 152 defines a diameter DOS of approximately 25.4 millimeters (1 inch), and a depth (along the axial direction) LOS of approximately 5 millimeters. Likewise, the inner step 154 defines a diameter DIS of approximately 12 mm. The outer step 152 is female-threaded to a pitch of 32 threads per inch (TPI) and the inner step 154 is female-threaded to a pitch of 0.5 mm. In general, the positioning of the steps and size of the space are constructed and arranged to accommodate the focal length of each lens type being employed herein.

In an embodiment, the front plate assembly 110 is constructed from metal (e.g. die cast aluminum alloy), which is finished using an appropriate machining process. The casting includes the depicted recesses 152, 154 and other supporting structures (i.e. walls 242, 251 and 252) for lenses and other internal components. Notably, the supporting walls 242 (etc.), which contact and/or surround the sensor circuit board 250 assist in directing heat away from the board 250 and its associated circuit components and into the housing structure, where the heat is dissipated into the surrounding ambient air. In alternate embodiments the layout and configuration of the supporting structures can vary. In general, the thickness of walls used in such supporting structures is selected to provide sufficient structural strength with respect to the material employed in constructing the front plate 110. The front plate assembly 110 includes, along its front face 164, a plurality of threaded holes 160 that can be female-threaded to any appropriate size, so as accept corresponding threaded screws (described below). These screws can be used to attach a plurality of fittings and accessories to the front plate.

Note that directional terms such as "front", "rear", "up", "down", "top" "bottom", "right", and "left", as well as their variants and synonyms, should be taken as relative conventions only, and not as absolute indications of orientation of a structure relative to the direction of prevailing gravitational force.

With reference particularly to FIG. 1, the face 164 of the front plate assembly 110 includes a pair of connection sockets 170 and 172 respectively oriented to the right and left of the aperture 150 (as viewed from the front). Both sockets include respective connectors, which are interconnected with the system's processor circuitry (i.e. 250 and 220). The right socket 170 is employed to operate the optics of a liquid lens (described above, and again below). The left socket 172 is employed to interconnect and operate an illumination assembly that can be directly attached to the front plate via threaded holes 160 or can be separately mounted. The illumination assembly is described in further detail in commonly assigned U.S. patent application Ser. No. 13/302,858, entitled CAMERA SYSTEM WITH EXCHANGABLE ILLUMINATION ASSEMBLY, by Laurens Nunnink, filed on Nov. 22, 2011 and the teachings of which are expressly incorporated herein by reference as useful background information.

The perimeter 180 of the aperture 150 includes a circumferential spring assembly 182 with a pair of diametrically opposed, radially inwardly directed retaining shoulders 184. The spring assembly 182 is removably secured to the front face 164 by opposed screws 186 (M2 thread in this embodiment) that threadingly seat into holes (502 in FIG. 5). In an embodiment, the screws 186 are separated by a distance (on-center) of approximately 28 millimeters, taken through the camera axis (230). As described further below, the removable spring assembly is constructed and arranged to retain a liquid lens assembly.

It is contemplated that a user receives a housing 100 with a cap (not shown) to protect the aperture and sensor, and that the applicable lens is purchased separately—to be attached by the user in a straightforward manner as described further below. Alternatively, the lens can be provided to the housing by the manufacturer. In either case, there are a wide range of lens choices available.

Figure 3:
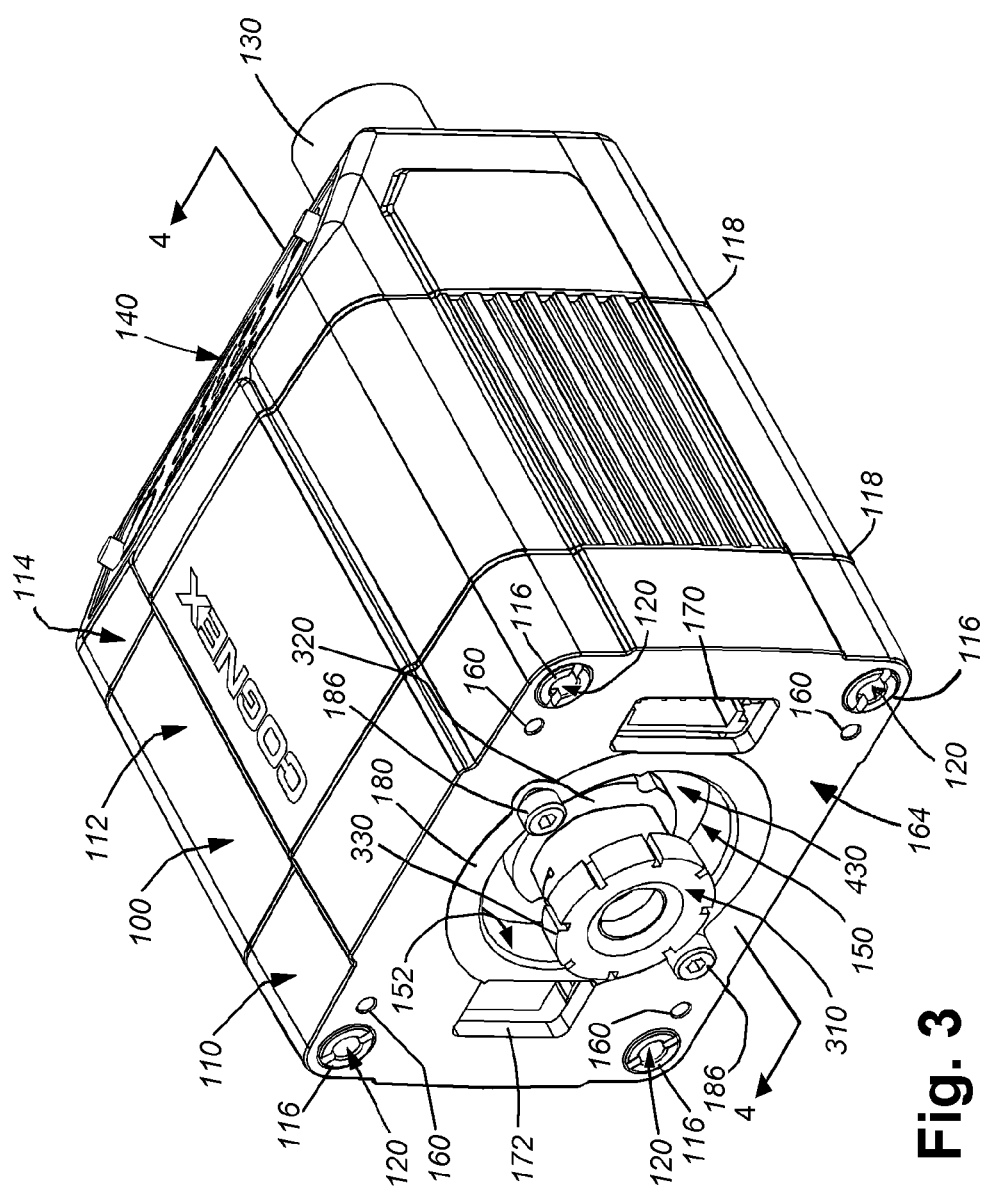
FIG. 3 is a perspective view of the vision system of FIG. 1 in which the housing includes an exemplary M12 type lens attached thereto, according to an illustrative embodiment.
Figure 4:
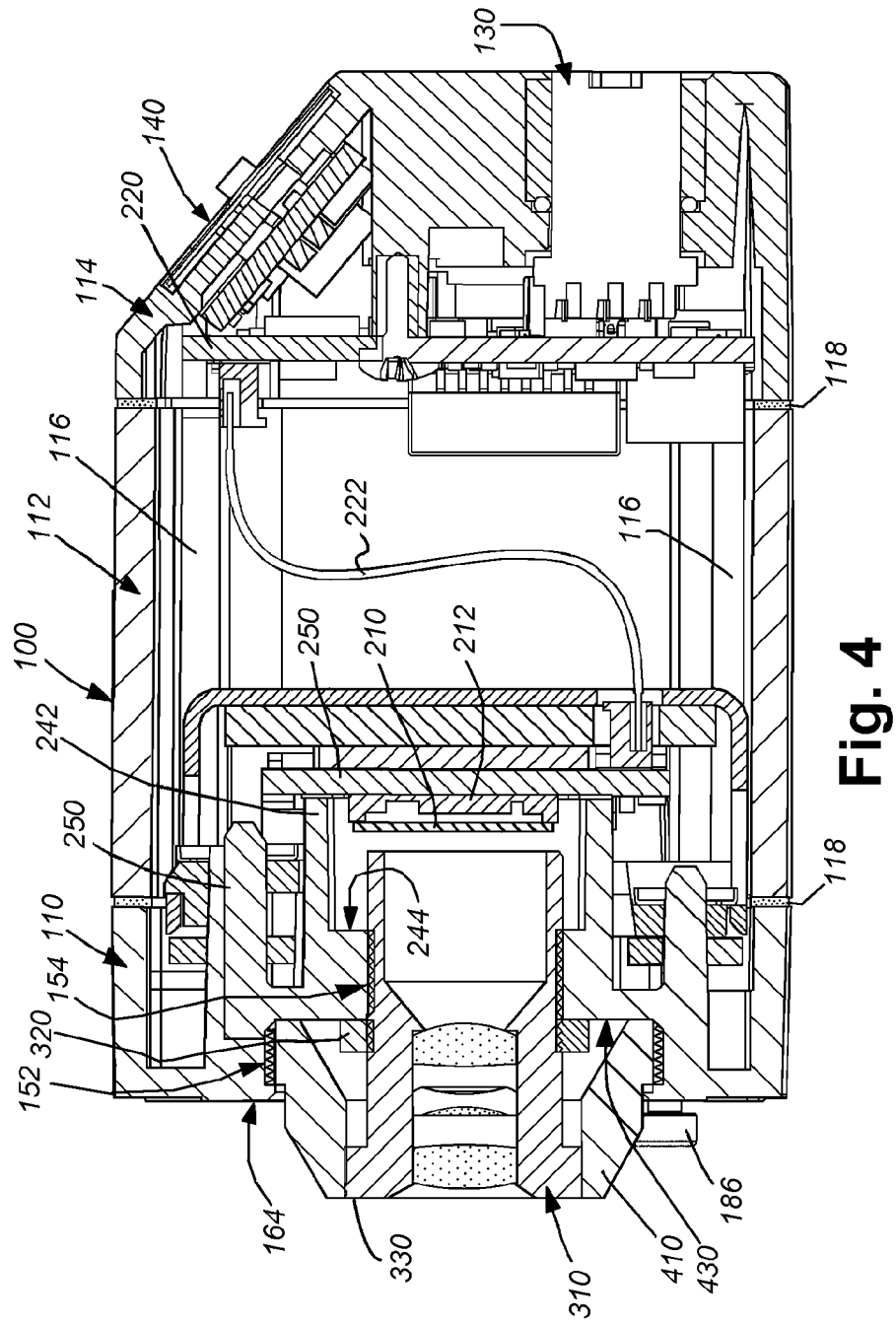
FIG. 4 is a side cross section of the housing taken along Line 4-4 of FIG. 3.

Having described the generalized construction and function of the housing 100 and front plate assembly 110 according to an illustrative embodiment, the implementation of various types of lenses in conjunction with the housing is now described in further detail. With reference to FIGS. 3 and 4, the housing 110 is provided with an attached M12 lens 310 according to an embodiment. By way of non-limiting example, the lens is a commercially available M12 lens with a conventional M12 threaded base. The male thread of the lens is secured into the female thread of the narrower, more-inset step 154, and is stopped from further inward threading, and generally locked in place using a counter nut 320, which is initially threaded onto the lens 310 base before attachment to the front plate assembly 110. The applied counter nut 320 can be adhered by the manufacturer (or another party) in place at an appropriate location along the lens using adhesive or another fixing technique. This ensures that, when the lens is tightened into place (e.g. by the user) to form a tight engagement with the front face 430 of the step 154 as shown, it is also positioned at a proper, predetermined distance with respect to the sensor's image plane. The lens 310 is thereby locked in place at a desired offset (to provide proper focal length) with respect to the plane of the sensor 212. Alternatively, where the user seeks to vary the mounting position of the lens, the counter nut can remain unfixed to the lens thread and counter-rotated by the user (or another party) to secure the lens in a desired position.

The front end of the lens can include a radially outwardly oriented ring 330 that engages the inner perimeter of an optional, frustoconically shaped stopper 410 (FIG. 4). The stopper protects the region of the aperture 150 between the lens front and the outer step 152, and avoids inadvertent loosening or readjustment of the tightened lens/counter ring 310/320 and protects against infiltration of dirt and moisture. The stopper 410 can be any acceptable shape, or alternatively omitted. It is secured to the front plate assembly 110 by a pressed-in friction fit that resides against the female threads in the outer step 152. It is illustratively mounted by pressing it into the thread well until it seats against the front face 430 of the inner step 154 as shown (FIG. 4). The stopper can be constructed from an elastomeric material. In alternate embodiments, the stopper can employ a different securing system with respect to the housing front plate assembly 110, such as clips or mating threads.

Figure 5:
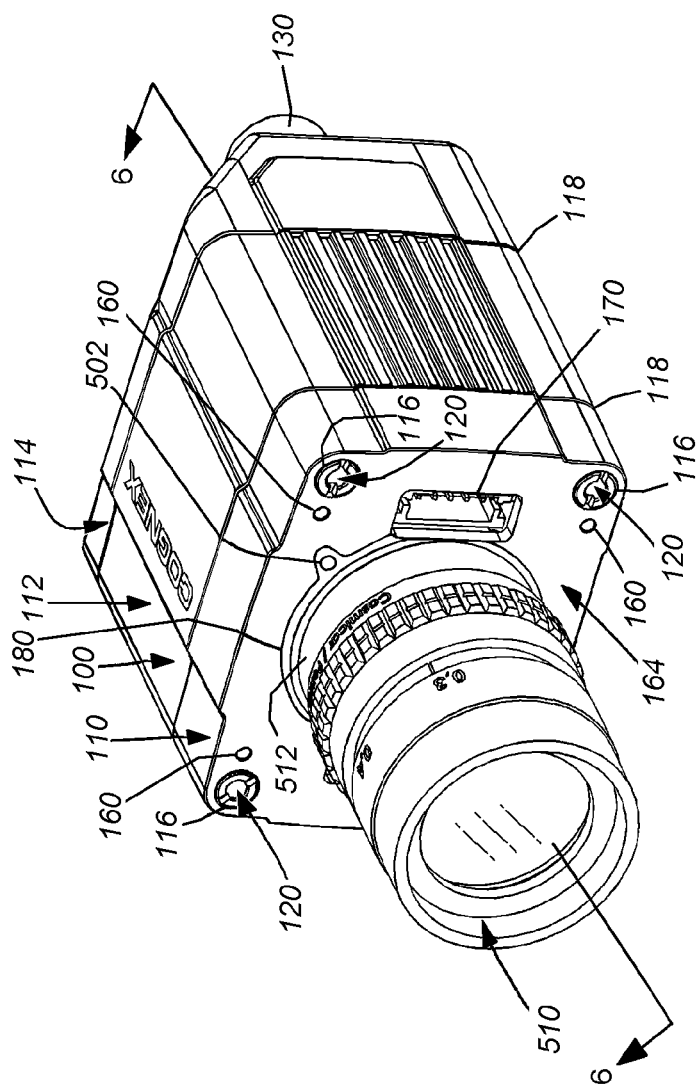
FIG. 5 is a perspective view of the vision system of FIG. 1 in which the housing includes an exemplary C-Mount type lens attached thereto, according to an illustrative embodiment.

It should be clear that attachment and detachment of the exemplary M12 lens 310 is relatively straightforward, and entails the threaded rotation of only a few components with respect to the inner step 154 and (optionally) the outer step 152. Thus, the user or the manufacturer can desirably assemble an M12 lens vision system from a few readily available components. Likewise, if the user desires a C-mount-lens-based vision system, the housing can be assembled as shown in FIGS. 5-7.

Figure 6:
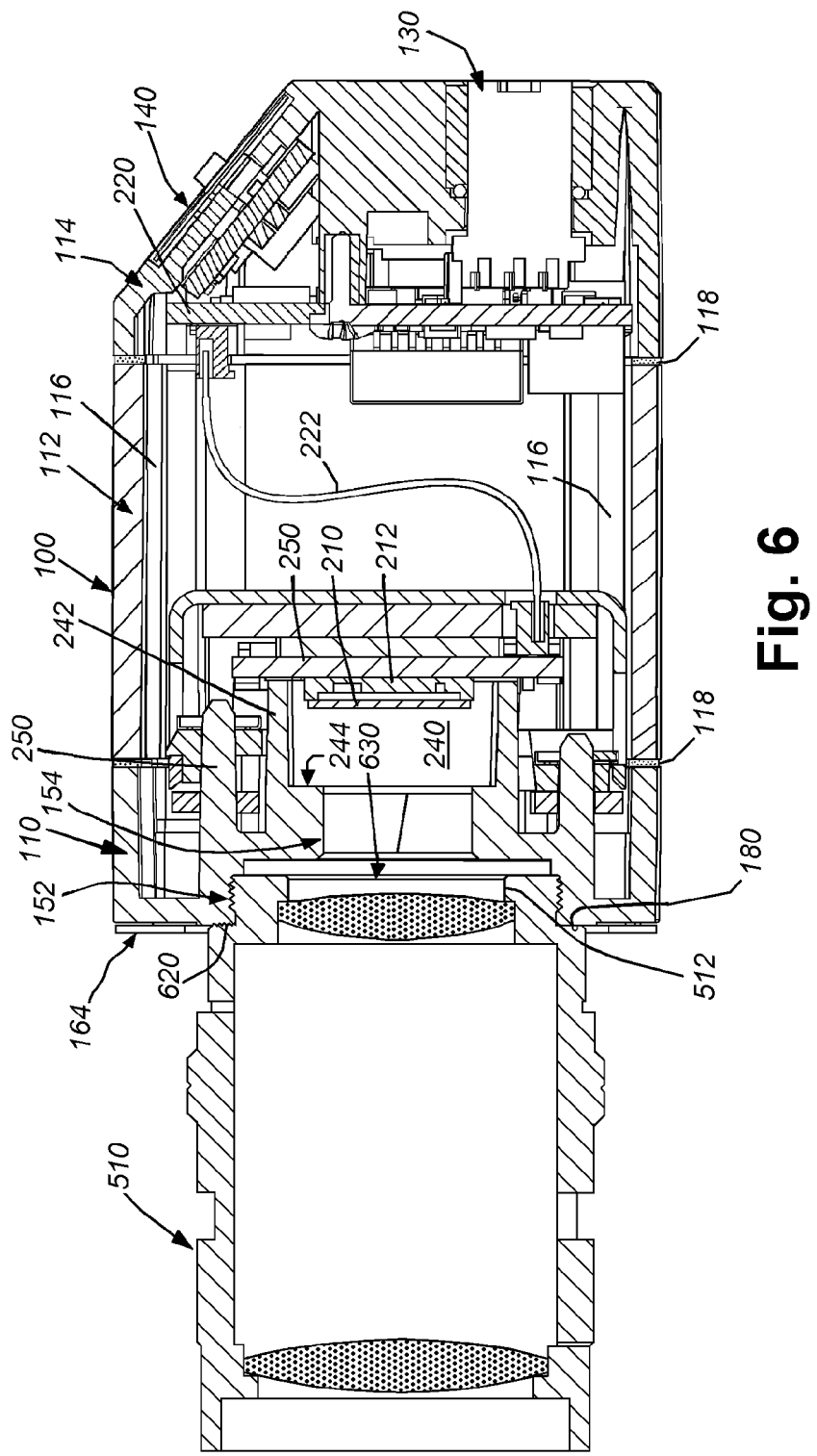
FIG. 6 is a side cross section of the housing taken along Line 6-6 of FIG. 5.
Figure 7:
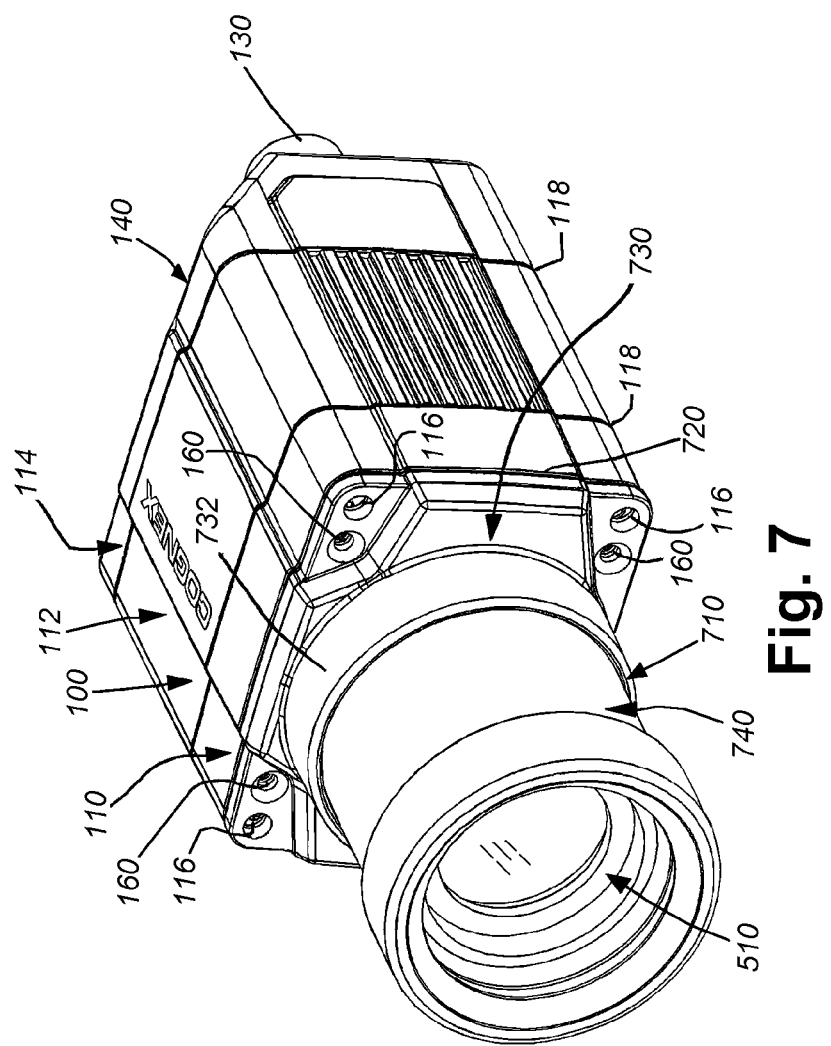
FIG. 7 is a perspective view of the vision system shown in FIG. 6 in which the housing includes the exemplary C-Mount type lens attached thereto, in which the lens is covered by an optional shroud assembly, according to an illustrative embodiment.

As shown, the male-threaded base 512 of the exemplary C-mount lens 510 is threadingly attached to the female threads of the outer step 152 as shown (FIG. 6). The base 512 is tightened until its rear shoulder 620 engages the perimeter 180 of the aperture 150. The perimeter 180 is spaced from the plane of the sensor at an appropriate distance so as to provide the proper focal length for the lens 510 with respect to the sensor's image plane. The perimeter 180 upon which the lens shoulder 620 can be slightly recessed (as shown) relative to the surrounding front face 164 to provide the correct clearance, or it can be raised relative thereto to provide the proper focal length. In alternate embodiments, the step 152 and its front perimeter face can be a lockable insert that is adjustable within the surrounding front plate assembly (using an outer coaxial thread that mates between the insert and the front plate, for example) to allow the seating location of the lens to vary, thereby varying the focal length. Notably, the optics of the lens 510, combined with the geometry of the front plate assembly 110 focuses received light rays so that they pass free of interference from the rear end 630 of the lens 510 through the smaller diameter step 154, and into the space 240. In this manner, the light rays received by the lens 510 are focused to cover the area of the sensor 212.

The C-Mount lens can be optionally covered by a shroud (or cover) assembly 710 (FIG. 7) that primarily protects it from ingress of dirt/contaminants and moisture. The shroud 710 can also serve to protect against inadvertent change to the lens settings. The shroud assembly consists of a gasket plate 720 that covers the front face (164) and an overlying shroud base 730. The gasket plate 720 and shroud base include through-holes that expose the central threaded holes (120) of each of the assembly bolts 116. This allows the system to be mounted as described above or receive additional accessories on top of the shroud base 730. The gasket plate 720 and shroud base 730 thereby cover and seal the sockets (170, 172) in this configuration. In alternate embodiments, one or both of the sockets 170, 172 can be exposed through the gasket plate 720 and shroud base 730. The shroud base 730 and gasket plate 720 are secured to the front plate assembly 110 are compressibly secured by four screws (not shown) that thread into the screw holes 160 formed on the front plate assembly 110. In this embodiment, the shroud base 730 is countersunk in the region of each threaded hole 160 to receive a correspondingly shaped machine screw. Different screws or any other fastener arrangement that secures the shroud base 730 and (optionally) the gasket plate 720 can be employed in alternate embodiments can be employed in alternate embodiments. The front ring 732 of the shroud base 730 receives the shroud body 740, which overlies and covers the lens 510. The shroud body 740 can be constructed as a single piece, or from a plurality of pieces (e.g. a main body and nose as shown). It can be secured to the ring 732 by a threaded interconnection or another fastening arrangement.

Figure 8:
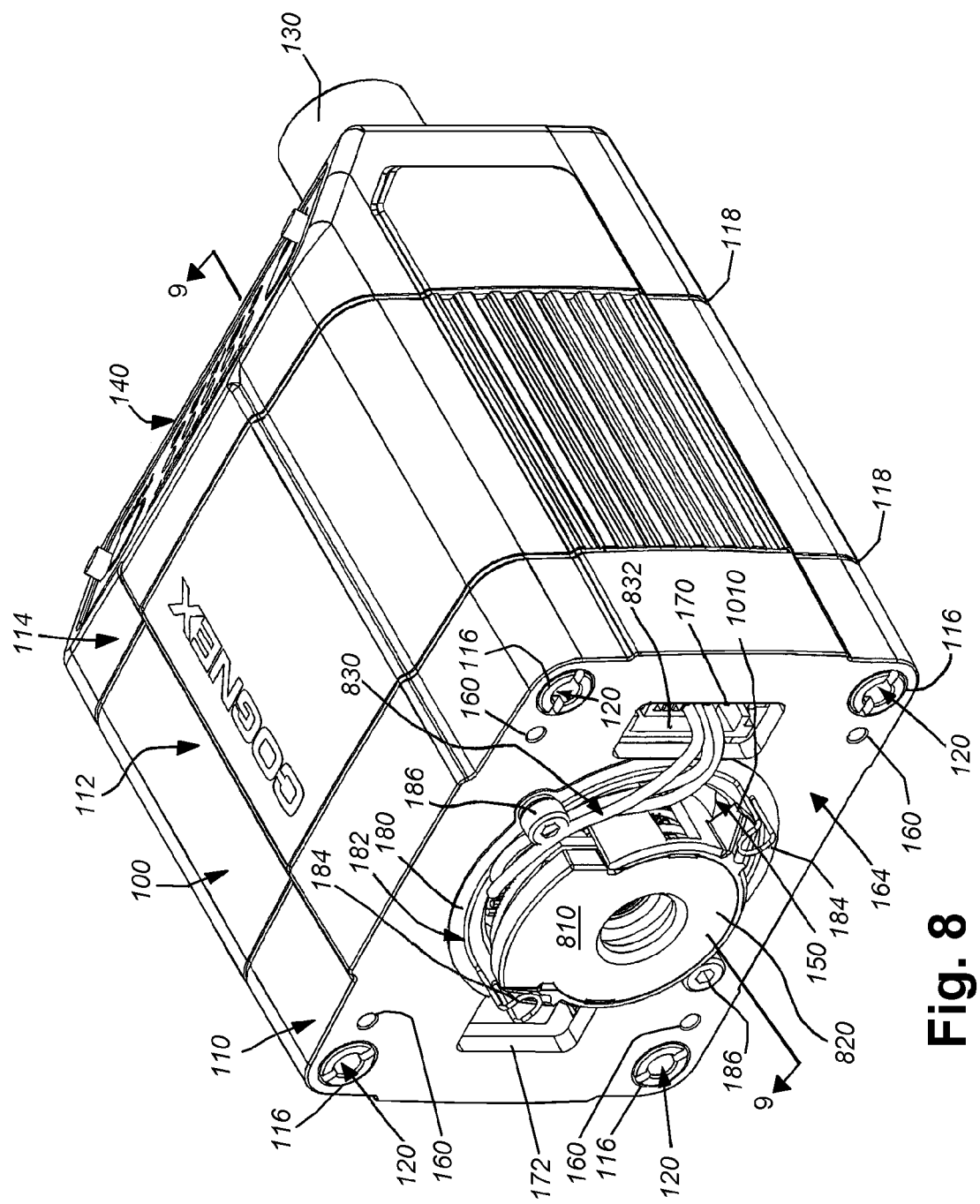
FIG. 8 is a perspective view of the vision system of FIG. 1 in which the housing includes an exemplary liquid type lens attached thereto, according to an illustrative embodiment.
Figure 9:
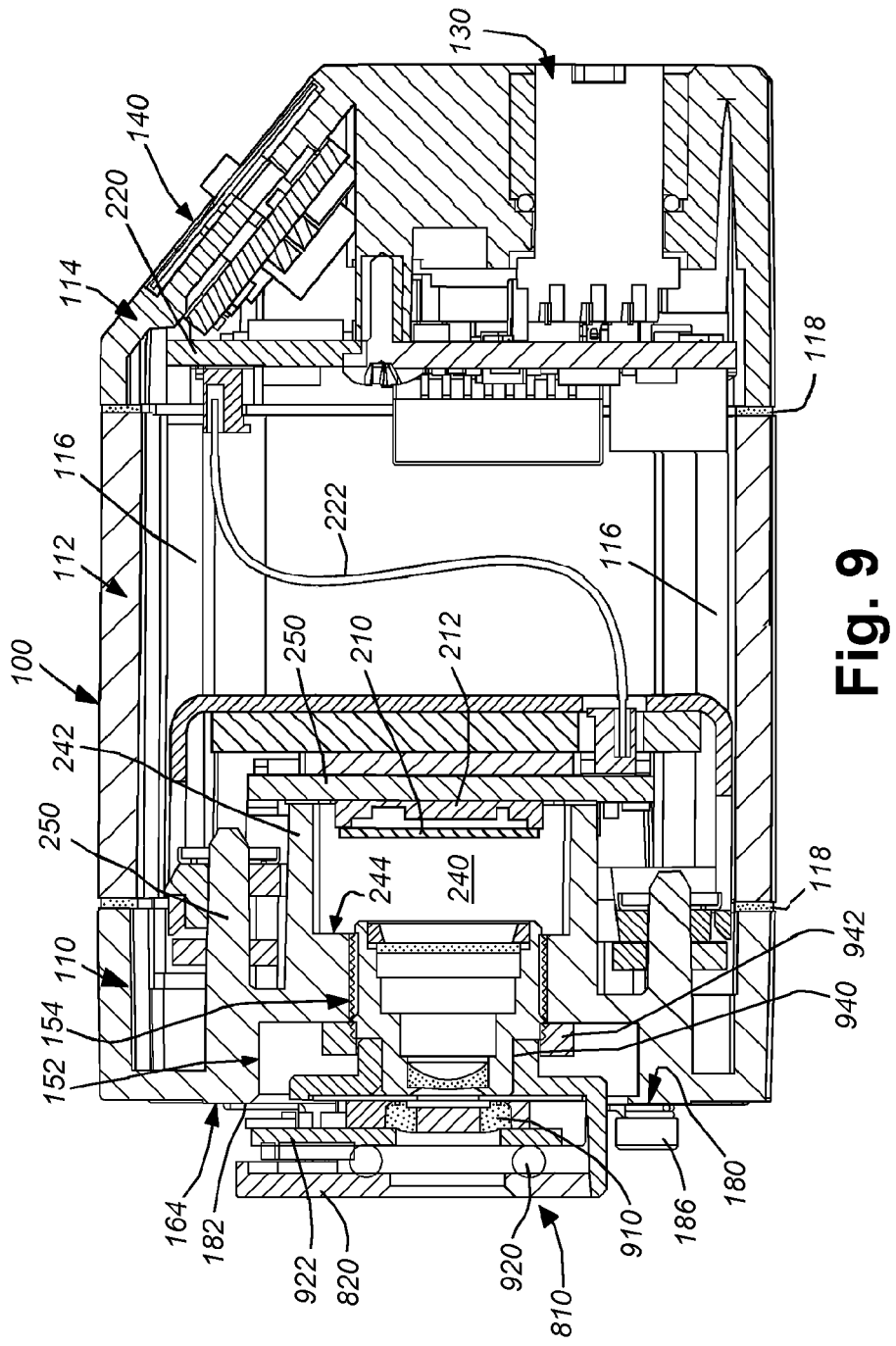
FIG. 9 is a side cross section of the housing taken along Line 9-9 of FIG. 8.
Figure 10:
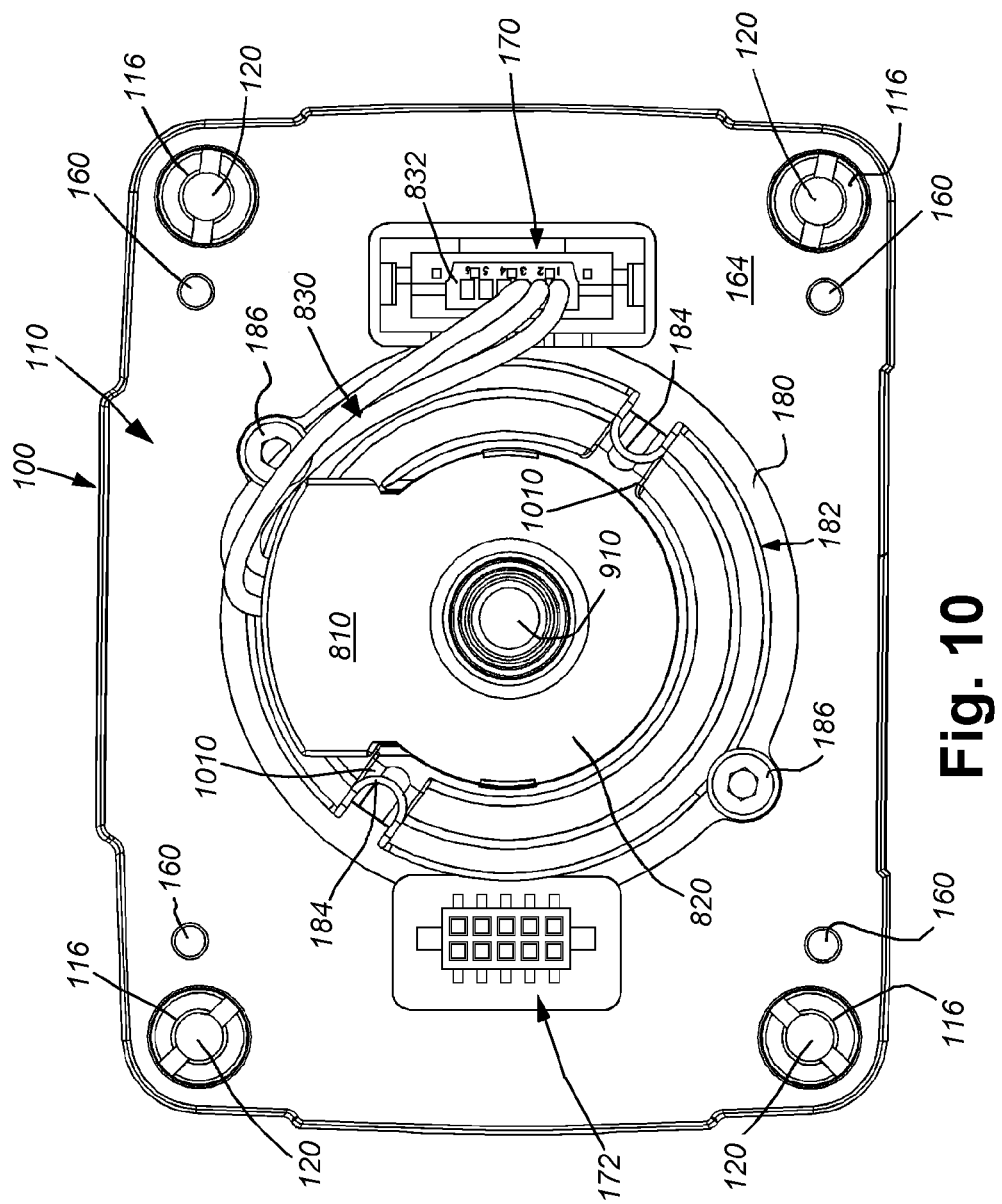
FIG. 10 is a front view of the vision system shown in FIG. 8 in which the housing includes the exemplary liquid type lens attached thereto, according to an illustrative embodiment.

Notably, with reference to FIGS. 8-10, the versatility of the housing 100 and front plate assembly 110 enables mounting of an electronically operated, auto-focusing liquid lens 810 according to an illustrative embodiment. As described also above, a liquid lens uses two iso-density liquids—oil is an insulator while water is a conductor. The variation of voltage passed through the lens by surrounding circuitry leads to a change of curvature of the liquid-liquid interface, which in turn leads to a change of the focal length of the lens. Some significant advantages in the use of a liquid lens are the lens' ruggedness (it is free of mechanical moving parts), its fast response times, its relatively good optical quality, and its low power consumption and size. The use of a liquid lens can desirably simplify installation, setup and maintenance of the vision system by eliminating the need to manually touch the lens. As noted above, relative to other autofocus mechanisms, the liquid lens has extremely fast response times. It is also ideal for applications with reading distances that change from object-to-object (surface-to-surface) or during the changeover from the reading of one object to another object.

In this embodiment, the exemplary liquid lens 810 can be based upon a commercially available liquid lens component 910 (FIG. 9) available from Varioptic SA of France. The liquid lens component 910 is mounted within an outer shell/housing 820 that is secured in place by the spring shoulders 184 described above. It is expressly contemplated that alternate hold-down arrangements for the liquid lens can be employed. For example, the housing can include a C-mount base that engages the threads of the outer step 152. An advantage of the spring-retained lens arrangement is that it allows for the positioning of the connector cable 830 in a location that leads properly to the socket 170 (where the cable's connector 832 is shown connected in FIG. 8). Note that the socket and connector can be any acceptable multi-pin arrangement that provides sufficient connections to control the lens.

The inner face of the lens' outer shell or housing 820 engages an O-ring (or other resilient structure that allows an open central aperture) 920 that, in turn, pressurably bears upon the circuit board 922. This circuit board 922 includes the control circuitry employed according to the art to operate the focal length adjustment of the lens component 910. The lens is compressed between the circuit board and the internal, fixed lens assembly 940 that focuses light rays from the liquid lens component onto the sensor 212. The fixed lens assembly 940 is secured into the front plate assembly 110 by threads that engage the inner step 154. A counter ring 942 prevents loosening of this lens assembly 940. The pressure applied by the spring retaining shoulders 184 is sufficient to retain the lens component 910 free of movement and vibration, but this pressure also remains within the desired specification to avoid over-compression of the lens component 910, which could degrade performance or burst the lens.

With reference briefly to the front view of FIG. 10, the spring retaining shoulders are arranged to engage associated abutments 1010 on each of opposing sides of the lens outer housing/shell 820. Like the spring assembly hold-down screws 186, the abutments 1010 are located at a non-vertical and non-horizontal angle with respect to the geometry (top, bottom, right and left sides) of the system housing 100. This allows for the cable 830 to exit the top end of the lens housing/shell 820 free of interference by the hold-down components. In this embodiment, the spring shoulders 184 (and abutments 1010) are aligned along a line that is approximately perpendicular to the line between the screws 186. In alternate embodiments a larger or smaller number of screws and/or spring shoulders 184 (among other fastening arrangements) can be used to retain the lens 810 with respect to the front face 164 of the housing 100. Likewise, it is contemplated that the overall spring assembly can be constructed as a single unit with an appropriate number of retaining shoulders to secure the lens, or a multi-part unit each having one or more shoulders (as shown).

It is expressly contemplated that the arrangement of components in both (or either of) the internal fixed lens assembly 942 and the overlying liquid lens module (810) are highly variable in alternate embodiments. The depicted illustrative embodiment is an effective arrangement that can be assembled in a straightforward manner by the manufacturer or user.

It should be clear that the vision system housing and associated front plate construction provides a highly versatile system for selecting and "directly attaching" a variety of desirable lenses and lens mount types that are traditionally not interchangeable on a single housing without (free of) additional adapters. Such adapters can reduce accuracy, increase the chance of loosening of components and generally increase the system's complexity. The resulting vision system allows for fewer specialized components and more customization either by the manufacturer or end user. More particularly, the system provides the end user with the ability to change out lens types so that the system can be updates or re-tasked to a new use from an earlier use, as desired.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, while the illustrative housing is adapted for use with M12 and C-mount lens bases, it is expressly contemplated that adapters can be employed to allow for attachment of other lens types, such as the T-mount lens—for example the above-described alternate embodiment having an outer step insert. Likewise, the front plate assembly can be constructed and arranged to provide a different combination of mounts by appropriately sizing and threading the stepped apertures. Moreover, while various components are attached using threaded screws, it is expressly contemplated that other fastener types can be used for various interconnections, such as snap-connectors, rivets, clips, and the like. Also, in an embodiment, a plurality of front plate assemblies can be produced and provided to a standard main body section and rear to allow for further versatility of the vision system. In addition, any process or processor herein can comprise one or more electronic hardware components, software in the form a non-transitory computer-readable medium of program instructions, or a combination of hardware and software. More generally, the term "process" should be taken broadly to include various combinations of hardware components and/or software program steps that perform one or more functions in a system or method. Accordingly, this description is meant to be taken only by way of example, and not to otherwise limit the scope of this invention.

What is claimed is:

1. A vision system housing comprising:
   a front plate assembly comprising an aperture aligned relative to an image sensor located within an interior of the housing, the aperture including an outer step having a first diameter and an inner step have a second diameter smaller than the first diameter; and
   a mounting assembly on an outer face of the front plate assembly, adjacent to the aperture, constructed and arranged to secure a liquid lens module,
   the inner step being constructed and arranged to engage a fixed lens assembly that interoperates with the liquid lens module and the outer step being constructed and arranged to receive a second lens type base.

2. The vision system as set forth in claim 1 wherein the outer step and the inner step each include female threads that, respectively engage male threads in the first lens type base and the second lens type base.

3. The vision system as set forth in claim 2 wherein the outer step is constructed and arranged to receive a C-mount lens base and the inner step is constructed and arranged to receive an M12 lens base.

4. The vision system as set forth in claim 1 further comprising a clip assembly, attached to the outer face of the front plate assembly, that removably engages an outer shell of the liquid lens module.

5. The vision system as set forth in claim 4 wherein the clip assembly includes spring assembly having shoulders that pressurably engage portions of the outer shell.

6. The vision system as set forth in claim 5 wherein the spring assembly is removably attached to the outer face of the front plate assembly by threaded fasteners.

7. The vision system as set forth in claim 1 wherein the front plate assembly includes a first socket, interconnected with control circuitry within the housing, that receives a cable to operate the liquid lens module.

8. The vision system as set forth in claim 7 wherein the front plate assembly includes a second socket, interconnected with control circuitry within the housing, that receives a cable to operate an illuminator.

9. The vision system as set forth in claim 1 wherein the front plate assembly is attached to a body section of the housing using bolts having ends that are exposed at the outer face of the front plate assembly and pass into the body section.

10. The vision system as set forth in claim 9 wherein the bolts include threaded holes for attaching at least one of a mount and an accessory to the front plate assembly.

11. The vision system as set forth in claim 1 wherein the outer step is constructed and arranged to threadingly receive a C-mount lens base and the front plate assembly includes a plurality of threaded holes that receive fasteners for securing a shroud assembly that covers the C-mount lens.

12. A vision system housing comprising:
    a front plate assembly comprising an aperture aligned relative to an image sensor located within an interior of the housing, the aperture including an outer step having a first diameter and in an inner step have a second diameter smaller than the first diameter; and
    a mounting assembly on an outer face of the front plate assembly constructed and arranged to secure a liquid lens module,
    the first inner step being constructed and arranged to engage a fixed lens assembly that interoperates with the liquid lens module receive a first lens type base and the second step being constructed and arranged to receive a second lens type base.

* * * * *